(12) United States Patent
Pan

(10) Patent No.: US 9,650,741 B2
(45) Date of Patent: May 16, 2017

(54) MASK AND A METHOD OF MANUFACTURING THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Shengkai Pan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/601,166

(22) Filed: Jan. 20, 2015

(65) Prior Publication Data

US 2016/0184854 A1 Jun. 30, 2016

(30) Foreign Application Priority Data

Dec. 30, 2014 (CN) .......................... 2014 1 0838256

(51) Int. Cl.
| | |
|---|---|
| *H01L 21/20* | (2006.01) |
| *D06M 15/70* | (2006.01) |
| *B32B 3/26* | (2006.01) |
| *D06M 23/00* | (2006.01) |

(52) U.S. Cl.
CPC .............. *D06M 15/70* (2013.01); *B32B 3/266* (2013.01); *D06M 23/00* (2013.01)

(58) Field of Classification Search
None
See application file for complete search history.

(56) References Cited

U.S. PATENT DOCUMENTS

| | | | | |
|---|---|---|---|---|
| 5,393,639 A | * | 2/1995 | Kourepenis | ........ B41M 5/38207 347/221 |
| 6,286,424 B1 | * | 9/2001 | Kinoshita | ................ B41C 1/14 101/127 |
| 6,318,255 B1 | * | 11/2001 | Larson | .................... B41F 15/36 101/127.1 |
| 6,413,313 B1 | * | 7/2002 | Yoshida | ................ C30B 15/007 117/200 |

(Continued)

FOREIGN PATENT DOCUMENTS

| | | |
|---|---|---|
| CN | 103839864 A | 6/2014 |
| CN | 103981485 A | 8/2014 |
| CN | 204803391 U | 11/2015 |

OTHER PUBLICATIONS

Office Action in Chinese Application No. 201410838256.X dated Jun. 27, 2016, with English translation. 7 pages.

(Continued)

*Primary Examiner* — Benjamin Sandvik
*Assistant Examiner* — Herve Assouman
(74) *Attorney, Agent, or Firm* — Blakely Sokoloff Taylor & Zafman LLP

(57) ABSTRACT

The present disclosure discloses a mask that comprises a nonmetallic layer and a hollow-out pattern through the nonmetallic layer. The present disclosure further discloses a method of manufacturing the mask, which comprises manufacturing the hollow-out pattern through the nonmetallic layer.

9 Claims, 2 Drawing Sheets

(56) References Cited

U.S. PATENT DOCUMENTS

| | | | | |
|---|---|---|---|---|
| 2002/0127477 | A1* | 9/2002 | Levinson | G03F 1/62 |
| | | | | 430/5 |
| 2003/0152691 | A1* | 8/2003 | Baude | C23C 14/042 |
| | | | | 427/96.8 |
| 2004/0104197 | A1* | 6/2004 | Shigemura | C23C 14/042 |
| | | | | 216/20 |
| 2006/0183029 | A1* | 8/2006 | Klauk | H01L 51/0011 |
| | | | | 430/5 |
| 2006/0257754 | A1* | 11/2006 | Harubayashi | G03F 1/62 |
| | | | | 430/5 |
| 2008/0018236 | A1* | 1/2008 | Arai | C23C 14/042 |
| | | | | 313/504 |
| 2009/0151630 | A1* | 6/2009 | Marcanio | C23C 14/042 |
| | | | | 118/504 |
| 2011/0179996 | A1* | 7/2011 | Park | C23C 14/042 |
| | | | | 118/504 |
| 2012/0107548 | A1* | 5/2012 | Sekihara | G03F 1/62 |
| | | | | 428/76 |

OTHER PUBLICATIONS

Office Action in Chinese Application No. 201410838256.X dated Nov. 18, 2016, with English translation. 5 pages.

* cited by examiner

MASK AND A METHOD OF MANUFACTURING THE SAME

RELATED APPLICATIONS

The present application claims the benefit of Chinese Patent Application No. 201410838256.X, filed Dec. 30, 2014, the entire disclosure of which is incorporated herein by reference.

TECHNICAL FIELD

The present disclosure relates to the semiconductor field, and in particular, to a mask and a method of manufacturing the same.

BACKGROUND

With the technical development of OLEDs (Organic Light Emitting Diode) and particularly the advent of the Active Matrix OLED (AMOLED), both sizes of the OLED product and the glass substrate continue to increase thus requiring constant enlargement of the size of a mask for use in manufacturing the OLED product to form film.

Conventionally, a photolithographic process for manufacturing a fine metal mask (FMM) of typically an Invar material requires equipments such as a coating machine, a high-precision exposure machine, a chemical etching machine, etc., allowing an optimum opening precision thereof at ±3 μm. However, such precision can only be reached on a small-sized substrate. As the scale of invested use of the AMOLED production line grows increasingly larger, the equipments responsible for manufacturing a mask severely lagged behind, mainly for the reason that it costs an expensive spending and excessive devotion for the research, development and manufacture of the related equipments. Moreover, a photomask needs to be pre-made for the mask being manufactured by a photolithographic process, and once a variation of the substrate layout occurs, the photomask becomes discarded. Therefore, currently the manufacture of an FMM mask by a photolithographic process is applicable only for small-sized production lines, with also a longer period and a higher cost required for the manufacture.

In a further aspect, if the precision requirement for the mask is not so high, it can be manufactured by using a laser cutting machine. In fact, for a laser cutting machine, it has by itself a remarkable precision of processing, which can reach an optimum of ±2-3 μm. However, since the thermal cutting of a metal sheet by laser causes thermal deformation easily, resulting in inability to release the accumulated stress in the metal, the metal sheet may begin to warp and turn folded very easily while being stretched into a mask, so that the flatness and the linearity of the mask can be disadvantageously affected. Consequently, a large size indeed for the substrate, such as G8.5 (a common type of substrates), may generally lead to a precision above 50 μm, or even worse.

As it can be seen, current high-precision film forming masks are confined to the metallic material (e.g. Invar) and a high cost, wherein the processing with a photolithographic process costs expensively and is not suited for large-scale production lines; a direct cutting with laser causes thermal deformation easily, by which the precision cannot be ensured and the requirement for a high-precision mask can hardly be met.

In general, after the processing is done for the mask, it requires also a stretching set for stretching the mask to ensure flatness and linearity of the mask. In the case where the precision of processing is limited, the required linearity and flatness may not be fulfilled if the tension is too much and the mask may be damaged if the tension is too small, which could result in reduced yields of the mask.

SUMMARY

It is an object of the present disclosure to provide a film forming mask and a method of manufacturing the mask, which preferably eliminate or at least alleviate one or more of the aforementioned various drawbacks in the prior art.

The applicant has found that many nonmetallic materials have the advantages of low thermal expansion coefficient, high stretching resistance/Yang's modulus, stable chemical properties, etc., and can be used as the mask instead of a conventional metallic material in terms of performance. Also, the nonmetallic material would not encounter thermal deformation and generate stress due to high temperature in laser cutting, and thus the precision of processing is directly determined by the laser cutting machine.

In particular, a carbon fiber (polyacrylonitrile carbonized wire drawing) cloth has not only the advantage of the inherent characteristics of a carbonic material (e.g. a low thermal expansion coefficient), but also the flexibleness and the machinability of a textile fiber, which is a new generation of enhanced fibers. Compared to the conventional glass fibers (GF), the Young's modulus of a carbon fiber cloth is over three times higher; compared to the Kevlar fibers (KF-49), the Young's modulus of a carbon fiber cloth is around twice higher, and also, it is insoluble and inexpansible in any of an organic solvent, an acid and an alkali, having an outstanding resistance for corrosion. In addition, the thickness of a carbon fiber cloth varies from 30 μm to 1000 μm, with a wide range for application. A typical carbon fiber cloth (e.g. a pre-oxidized support-free carbon fiber cloth) can endure a high temperature up to 200-300° C., and thus can fully bear the process temperature for the film formation (generally no more than 80° C.). Further, since there is a small deformation and no debris generated upon the laser cutting of the carbon fiber cloth, the carbon fiber cloth is more adapted to a laser cutting than a metallic material.

In a first aspect of the present disclosure, a mask is provided, which may comprise a nonmetallic layer and a hollow-out pattern through the nonmetallic layer. The hollow-out pattern corresponds with the desired pattern for the film forming process. Compared to the current Invar materials, the nonmetallic material has a low thermal expansion coefficient, a high stretching resistance/Yang's modulus and a stable chemical properties, and also, without the occurrence of thermal deformation and generation of stress due to high temperature in the laser cutting, thus the precision of processing is directly determined by the laser cutting machine, i.e. reaching possibly an optimum of ±2-3 μm, which is substantially the same as that for the photolithographic process. Furthermore, the improved precision of processing of the mask can cut down on the difficulty of stretching substantially, that is, with only a very small tension, the linearity and the flatness of the mask can be ensured to standard, so that a yield of the stretching can be increased.

According to an embodiment of the present disclosure, the nonmetallic layer can be pre-stretched. A pre-stretched nonmetallic layer can have a flatness less than 50 μm or better.

According to an embodiment of the present disclosure, the nonmetallic layer may be a carbon fiber cloth. A carbon fiber cloth has not only the advantage of the inherent characteristics of a carbonic material (e.g. a low thermal expansion coefficient), but also the flexibleness and the machinability of a textile fiber. The Young's modulus of a carbon fiber cloth is over three times higher than that of a conventional glass fiber and is around twice higher than that of a Kevlar fiber, and it has also an outstanding resistance for corrosion. Additionally, the carbon fiber cloth is controllable in thickness, which would have a small deformation and no debris generated when being laser cut.

According to an embodiment of the present disclosure, the carbon fiber cloth may be a pre-oxidized support-free carbon fiber cloth. The pre-oxidized support-free carbon fiber cloth is a common type of carbon fiber cloths, which can endure a high temperature up to 200-300° C., and thus can fully bear the process temperature for the film formation.

According to an embodiment of the present disclosure, the nonmetallic layer may have a thickness of 30-1000 μm. Within this range, the thickness of the nonmetallic layer is controllable, thus resulting in a wide range of applicability.

According to another embodiment of the present disclosure, the mask may further comprise a coating on at least one side of the nonmetallic layer, with the hollow-out pattern through the coating as well. The coating can be manufactured on the nonmetallic layer via a conventional process measure, such as spin-coating, sputtering, evaporation, etc. The presence of the coating can improve the flatness of the nonmetallic layer and cut down on the difficulty of the subsequent stretching process. The coating can be manufactured on one or both sides of the nonmetallic layer as required.

According to an embodiment of the present disclosure, the nonmetallic layer and the coating may be pre-stretched. Pre-stretching the nonmetallic layer and the coating together can further improve the flatness of the mask, reducing substantially the difficulty of the stretching process and the requirement for the stretching set.

According to an embodiment of the present disclosure, the coating may have a thickness of 1-20 μm.

According to an embodiment of the present disclosure, the coating may comprise an organic binder.

According to an embodiment of the present disclosure, the organic binder may comprise a photoresist. The photoresist is a very common organic binder, which is of various types with mature process parameters, and is controllable in thickness. The photoresist generally has the adhesivity for withstanding a subsequent process such as etching and ion injection, the heat endurance stability and the etching resistant capability, and also, it has a relatively small surface tension, so that the photoresist has good fluidity and coverage.

According to an embodiment of the present disclosure, the hollow-out pattern may be formed by means of laser cutting. The formation of a hollow-out pattern with laser cutting is beneficial to simplifying the process steps and lowering the cost, and also, with a high-precision laser cutting machine, a perfect precision of processing can be ensured.

According to a further embodiment of the present disclosure, the mask may also comprise a mask frame for supporting said nonmetallic layer. The mask frame may be made of a stainless steel. In particular, the nonmetallic layer may be secured to the mask frame by using an adhesive material. In the case where at least one side of the nonmetallic layer is formed with a coating, the mask frame supports both of the nonmetallic layer and the coating.

In a second aspect of the present disclosure, a method of manufacturing a mask is provided, which comprises manufacturing a hollow-out pattern through a nonmetallic layer.

According to an embodiment of the present disclosure, the method may also comprise pre-stretching the nonmetallic layer prior to manufacturing the hollow-out pattern of the nonmetallic layer.

According to an embodiment of the present disclosure, the method may also comprise manufacturing a coating on at least one side of the nonmetallic layer, with the hollow-out pattern through the coating as well.

According to an embodiment of the present disclosure, the method may also comprise manufacturing a coating on at least one side of the nonmetallic layer prior to pre-stretching the nonmetallic layer, with the hollow-out pattern through the coating as well. The nonmetallic layer and the coating thereon can then be pre-stretched together to further improve the flatness of the mask.

According to an embodiment of the present disclosure, the method may also comprise securing the nonmetallic layer to a mask frame. In particular, an adhesive material is used for securing of the nonmetallic layer to the mask frame. In the case where at least one side of the nonmetallic layer is formed with a coating, the nonmetallic layer and the coating can be together secured to the mask frame.

DESCRIPTION OF DRAWINGS

The other objects and features of the present disclosure will become apparent from the detailed description as follows in conjunction with the accompanying drawings. However, it is to be understood that the respective drawings are shown for exemplary purpose only, rather than restrictive, and the drawings are not necessarily drawn to scale, wherein.

DESCRIPTION OF EMBODIMENTS

In order to make the objects, technical solutions and advantages of embodiments of the present disclosure clearer, the technical solutions of the embodiments of the present disclosure will be described clearly and completely as follows in conjunction with the accompanying drawings. It is evident that the described embodiments of the disclosure are a part of embodiments rather than all the embodiments. Based on the described embodiments of the present disclosure, all the other embodiments obtainable by those ordinarily skilled in the art without making inventive effort belong also to the protection scope of the present disclosure.

Figure 1:
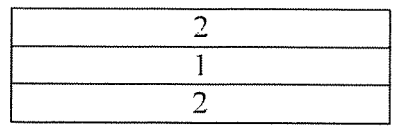
FIG. 1 illustrates a schematic sectional view of a mask according to an embodiment of the present disclosure.

FIG. 1 illustrates a schematic sectional view of a mask according to an embodiment of the present disclosure. As shown in FIG. 1, the mask comprises a nonmetallic layer 1 and a coating 2 on the upper and lower sides of the nonmetallic layer 1. The nonmetallic layer 1 may have a thickness of 30-1000 μm, and the coating 2 may have a thickness of 1-20 μm. For the sake of clarity and simplification, a hollow-out pattern through the nonmetallic layer and the coating is omitted, where the hollow-out pattern is formed by laser cutting. A person skilled in the art should understand that the shape of the mask in FIG. 1 is schematic, and the nonmetallic layer 1 may be provided with the coating on only one side thereof or without the coating. In some embodiments of the present disclosure, the nonmetallic layer 1 may be pre-stretched. In some other embodiments of the present disclosure, the nonmetallic layer 1 may be a carbon fiber cloth, particularly a pre-oxidized support-free carbon fiber cloth, and the coating 2 may comprise an organic binder, particularly a photoresist. A mask frame may be provided below the nonmetallic layer 1 and the coating 2 (not shown in FIG. 1).

Figure 2:
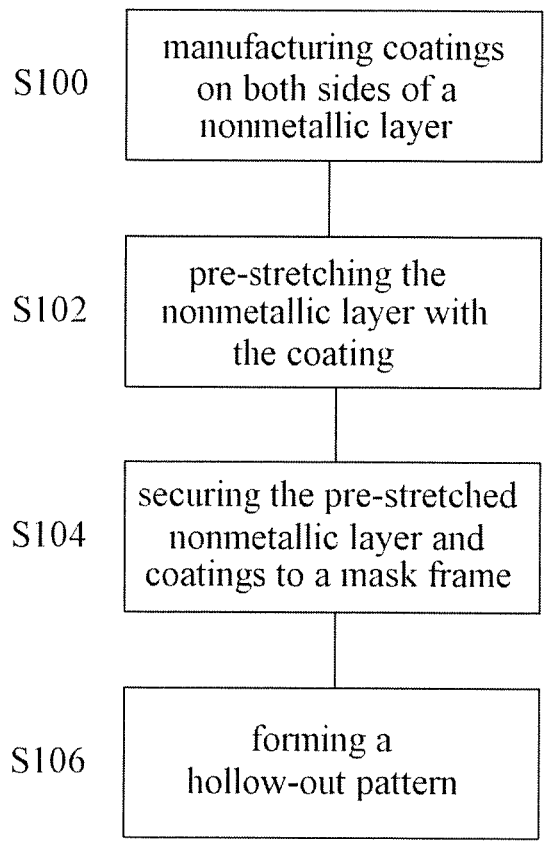
FIG. 2 illustrates a flow chart of a method for manufacturing a mask according to an embodiment of the present disclosure.
Figure 3:
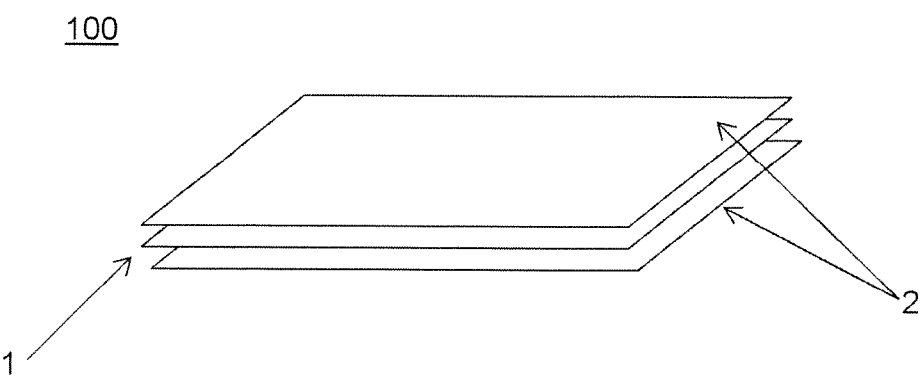
FIGS. 3-5 illustrate schematic diagrams of some steps of the method shown in FIG. 2.
Figure 4A:
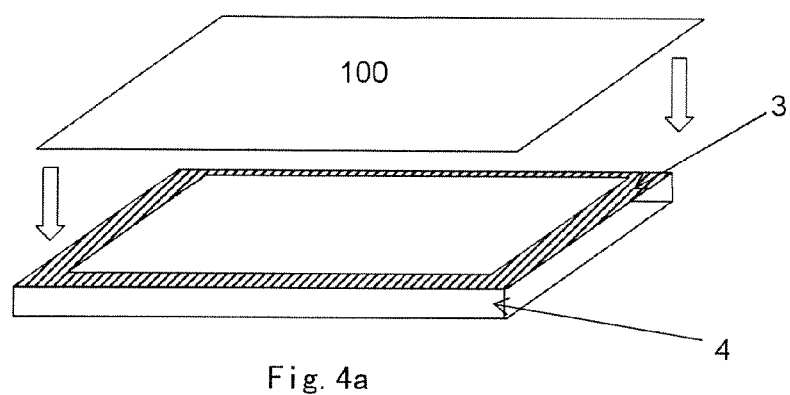
Figure 4B:
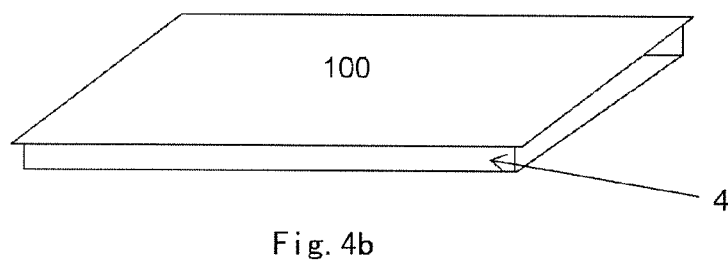
Figure 5:
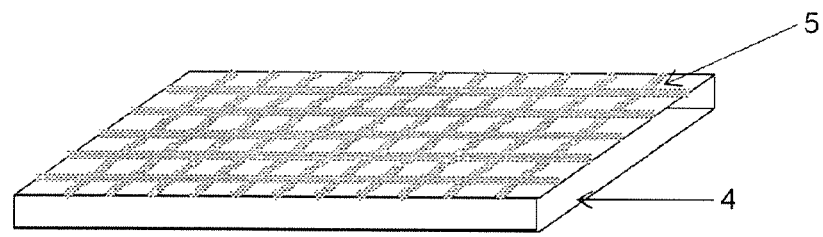

FIG. 2 illustrates a flow chart of a method of manufacturing a mask according to an embodiment of the present disclosure, and FIGS. 3-5 illustrate schematic diagrams of some steps of the method shown in FIG. 2. In step S100, as shown in FIG. 3, the coating 2 is manufactured on both sides of the nonmetallic layer 1 to form a structure 100, wherein the thickness of the nonmetallic layer 1 may be 30-1000 µm. The coating 2 may be formed by a conventional process such as sputtering, spin-coating, evaporation, etc. and may have a thickness of 1-20 µm. In step S102, pre-stretching structure 100 to made it into a flatness less than 50 µm or better. In step S104, as shown in FIGS. 4a-4b, the pre-stretched structure 100 is secured, via an adhesive material 3, to a hollow mask frame 4. In order not to affect the later film forming process, the adhesive material 3 and the mask frame 4 contact only an edge portion of the structure 100. A person skilled in the art may envisage many other ways of securing the pre-stretched structure 100 to the mask frame 4. In step S106, the structure 100 is laser-cut with a high-precision laser cutting machine to acquire a hollow-out pattern 5 corresponding with the desired pattern for the film forming process, as shown in FIG. 5. Note that the hollow-out pattern 5 in FIG. 5 is schematic and a person skilled in the art may design various hollow-out patterns as needed. In some embodiments of the present disclosure, some steps of the method may be omitted. For example, in some embodiments, the step of pre-stretching structure 100 may be spared. In some other embodiments, the coating may be manufactured on only one side of the nonmetallic layer, or the step of manufacturing the coating may be spared. In some further embodiments, the step of securing the structure 100 to the mask frame may be spared.

Figure 6:
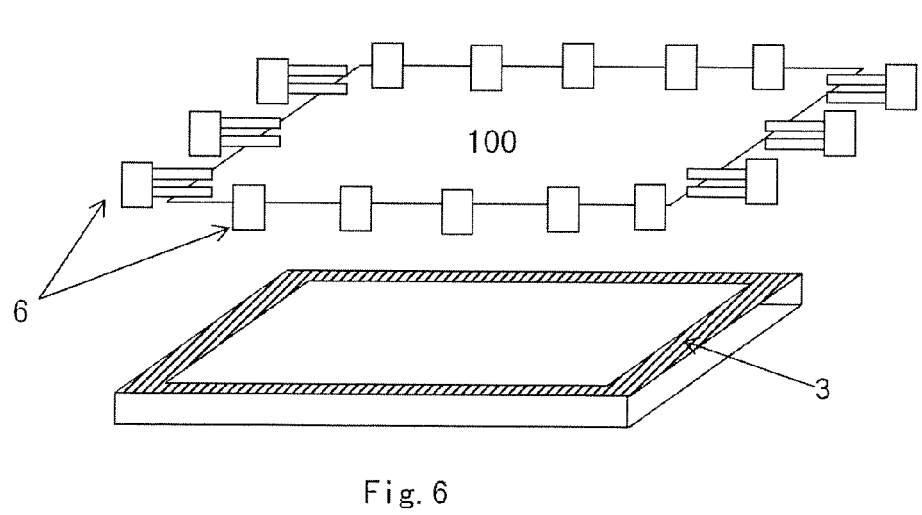
FIG. 6 illustrates a schematic diagram of the step of securing a nonmetallic layer and a coating to a mask frame according to an embodiment of the present disclosure.

FIG. 6 illustrates a process of securing the structure 100 to the mask frame 4. As shown in FIG. 6, a fixture 6 is used for pre-stretching the structure 100 and securing it then to the mask frame 4 via the adhesive material 3. The adhesive material 3 may be a common binding agent such as a double-sided tape. However, it may be envisaged that the mask frame 4 may not be provided, but instead the mask is secured in use to a coating device via an electrostatic adsorption device, as disclosed in the Chinese patent application No. CN 201410062742.7.

While the disclosure has been illustrated and described in detail in the drawings and forgoing description, such illustration and description are to be considered illustrative or exemplary and not restrictive; the disclosure is not limited to the disclosed embodiments.

Other variations to the disclosed embodiments can be understood and effected by those skilled in the art in practicing the claimed invention, from a study of the drawings, the disclosure, and the appended claims. In the claims, the word "comprise" and its variations do not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A mask comprising a nonmetallic layer and a coating on both sides of the nonmetallic layer forming an integral structure including a hollow-out pattern through the nonmetallic layer and the coating, wherein the nonmetallic layer and the coating are pre-stretched.

2. The mask according to claim 1, wherein the nonmetallic layer is a carbon fiber cloth.

3. The mask according to claim 1, wherein the thickness of the nonmetallic layer is 30-1000 µm.

4. The mask according to claim 1, wherein the thickness of the coating is 1-20 µm.

5. The mask according to claim 1, wherein the coating comprises an organic binder.

6. The mask according to claim 1, wherein the hollow-out pattern is formed by laser cutting.

7. The mask according to claim 1, further comprising a mask frame supporting the nonmetallic layer.

8. A method of manufacturing a mask, the method comprising:
 manufacturing a hollow-out pattern through a nonmetallic layer;
 pre-stretching the nonmetallic layer prior to manufacturing the hollow-out pattern of the nonmetallic layer; and
 manufacturing the coating on both sides of the nonmetallic layer prior to pre-stretching the nonmetallic layer, with the hollow-out pattern through the coating as well, wherein the coating is integral to the mask.

9. The method according to claim 8, further comprising securing the nonmetallic layer to a mask frame.

* * * * *